US011063935B2

(12) United States Patent
Tobkes et al.

(10) Patent No.: US 11,063,935 B2
(45) Date of Patent: Jul. 13, 2021

(54) SYSTEMS AND METHODS FOR PROVIDING REMOTE DESKTOP ACCESS

(71) Applicant: Citrix Systems, Inc., Fort Lauderdale, FL (US)

(72) Inventors: Rachelle Tobkes, Davie, FL (US); Yufeng Shi, Nanjing (CN); Jyoti Mathur, Pompano Beach, FL (US); Christopher Fleck, Hillsboro Beach, FL (US); John McBride, Coral Springs, FL (US); Jacob J. Summers, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 253 days.

(21) Appl. No.: 15/959,531

(22) Filed: Apr. 23, 2018

(65) Prior Publication Data

US 2019/0327227 A1    Oct. 24, 2019

(51) Int. Cl.
| | |
|---|---|
| *H04L 29/06* | (2006.01) |
| *G06F 21/32* | (2013.01) |
| *H04L 29/08* | (2006.01) |
| *H04L 9/32* | (2006.01) |
| *G06F 9/451* | (2018.01) |

(52) U.S. Cl.
CPC .......... *H04L 63/0861* (2013.01); *G06F 9/452* (2018.02); *G06F 21/32* (2013.01); *H04L 9/3213* (2013.01); *H04L 63/0823* (2013.01); *H04L 63/102* (2013.01); *H04L 63/107* (2013.01); *H04L 63/12* (2013.01); *H04L 67/14* (2013.01)

(58) Field of Classification Search
CPC ..... H04L 63/08; H04L 63/0861; H04L 63/12; H04L 63/10; G06F 21/31; G06F 21/32
See application file for complete search history.

(56) References Cited

U.S. PATENT DOCUMENTS

| | | | |
|---|---|---|---|
| 7,478,068 B2 * | 1/2009 | Maritzen | G06Q 20/341 705/51 |
| 2005/0210270 A1 * | 9/2005 | Rohatgi | G06F 21/32 713/186 |
| 2006/0092266 A1 * | 5/2006 | Morgan | H04N 1/32117 348/14.01 |

(Continued)

OTHER PUBLICATIONS

International Search Report and Written Opinion dated Jul. 25, 2019 for PCT/US2019/028449.

*Primary Examiner* — Dao Q Ho
(74) *Attorney, Agent, or Firm* — Fox Rothschild LLP; Robert J. Sacco; Carol E. Thorstad-Forsyth (57) ABSTRACT

Systems and methods for obtaining access to a session with a remote cloud service server. The methods comprising: receiving, by a first client computing device, a user unique identifier from a mobile device located in proximity to the first client computing device; and performing facial recognition operations by the first client computing device subsequent to the reception of the user unique identifier. The facial recognition operations comprise: capturing an image of the mobile device's user; and analyzing the image to obtain a user name associated with the facial features represented therein. A determination is made as to whether the user name matches the user unique identifier. If so, a first session with the remote cloud service server is automatically launched.

17 Claims, 5 Drawing Sheets

(56) References Cited

U.S. PATENT DOCUMENTS

2013/0268767 A1   10/2013  Schrecker
2015/0067775 A1    3/2015  Cardone et al.
2016/0063234 A1*  3/2016  Charng .............. G06K 9/00281
                                                                726/19

* cited by examiner

SYSTEMS AND METHODS FOR PROVIDING REMOTE DESKTOP ACCESS

BACKGROUND

Statement of the Technical Field

The present disclosure relates generally to computing systems. More particularly, the present disclosure relates to implementing systems and methods for providing remote desktop access using proximity and facial recognition as a two-factor authentication.

Description of the Related Art

Remote desktops are often used by business entities to allow employees access to various software applications and services. Prior to establishing a session with a remote server, the user is authenticated for purposes of ensuring that only authorized personal obtain access to certain resources. The user authentication involves using either (a) a user's proximity to a thin client or (b) facial recognition. The user authentication needs to be performed each time the user attempts to obtain access to a thin client.

Despite the advantages of the conventional user authentication techniques, they suffer from certain drawbacks. For example, facial recognition can be spoofed if one holds up a picture of someone else's face. Likewise, a user's proximity to a thin client alone may be insecure due to the possibility of the session accidently launching on an unwanted terminal when the user is simply walking by.

SUMMARY

The present disclosure concerns implementing systems and methods for obtaining access to a session with a remote cloud service server. In some scenarios, the methods comprise: detecting when a mobile device is in proximity to a first client computing device (e.g., using a beacon); receiving, by the first client computing device, a user unique identifier and/or a partial or full session token sent from the mobile device; initiating facial recognition operations in response to the first client computing device's reception of the user unique identifier; and/or performing the facial recognition operations by the first client computing device.

The facial recognition operations comprise: capturing an image of the mobile device's user; and analyzing the image to obtain a user name associated with the facial features represented therein. In some scenarios, the username is obtained by: comparing facial features of the image to a facial feature database including facial feature information for a plurality of individuals; detecting a match of the image's facial features and the facial features associated with an individual of the plurality of individuals; and retrieving the user name associated with the individual having the matching facial features A determination is made as to whether the user name matches the user unique identifier. If so, then the following operations are performed: authenticating the user with the remote cloud service sever using the partial or full session token; and/or automatically launching a first session with the remote cloud service server. Notably, the user obtains access to the first session without entering credentials into the first client computing device. If the user name does not match the user unique identifier, then the user may be allowed access to the first session using a manual user input based authentication scheme (e.g., by entering a username and/or password into the first computing device).

In those or other scenarios, the user is authenticated once by the mobile device prior to obtaining access to a first session at a first time using the first computing device and access to a second session at a second time using a second different computing device. The user may be periodically authenticated by the mobile device in accordance with a timing scheme of a certificate issued to the mobile device.

In those or yet other scenarios, the methods comprise: receiving, by a first computing device, first authentication information; receiving, by a second computing device, second authentication information that is different than the first authentication information; analyzing the second authentication information to verify that the user identified thereby is the same as the user identified by the first authentication information; generating a full resource token based on the first authentication information and the second authentication information, when a verification has been made that the users identified by the first and second authentication information are the same; and providing access to the resource using the full resource token.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for providing remote desktop access using proximity and facial recognition as a two-factor authentication. In accordance with the present solution, a user authenticates once on his (her) mobile device (e.g., a smart phone). When the user arrives within proximity of a client computing device (e.g., a thin client), the mobile device transmits a unique identifier for the user (e.g., a username) to the client computing device. The client computing device then initiates facial recognition operations thereof. The user's face is recognized on the client computing device. The client computing device then obtains a username associated with user's face in a datastore. The username is compared to the user's unique identifier received from the mobile device. If a match exists, the user's remote session is launched on the client computing device.

The present solution has many novel features. For example, existing conventional solutions only use one or the other (i.e., proximity or facial recognition), rather than a combination of the two as is done in the present solution. In the present case, users must only authenticate a single time, and then (s)he is able to move from client computing device to client computing device in a secure and efficient manner. This is not the case in conventional systems. The present solution also eliminates the need to distinguish client computing devices that are in close proximity to each other if only beacon authentication was used (i.e., no added Personal Identification Number ("PIN") required).

The present solution overcomes various drawbacks of conventional authentication solutions. For example, the present solution solves the problem of security issues that may arise with facial recognition. As mentioned above, facial recognition can be spoofed if one holds up a picture of someone else's face. Likewise, proximity alone may be insecure due to the possibility of the session accidentally launching on an unwanted terminal when the user is simply walking by. Lastly, the present solution minimizes the time that it takes to authenticate and launch a session which is extremely crucial in environments such as hospitals where time is critical.

The present solution solves the problem of facial recognition being insecure by ensuring that the user's face is not only visible but is also within proximity of the client computing device. Likewise, if proximity is used in combination with facial recognition, sessions will not accidentally launch when the user is passing by because the user's face must also be seen at the client computing device. A user will only have to authenticate once to his (her) mobile device, and then (s)he can move from client computing device to client computing device without having to type in credentials or a pin each time to access his (her) remote session. Once the user is within proximity of the client computing device and the client computing device recognizes the user's face as the user who approached it, the session will simply launch (only consisting of a few seconds).

As noted above, the present solution does not require having to tap a badge or enter a pin number into the client computing device. Accordingly, the present solution saves the user time by being able to simply walk up to the client computing device to authenticate and launch a session rather than having to use peripherals to gain access.

Figure 1:
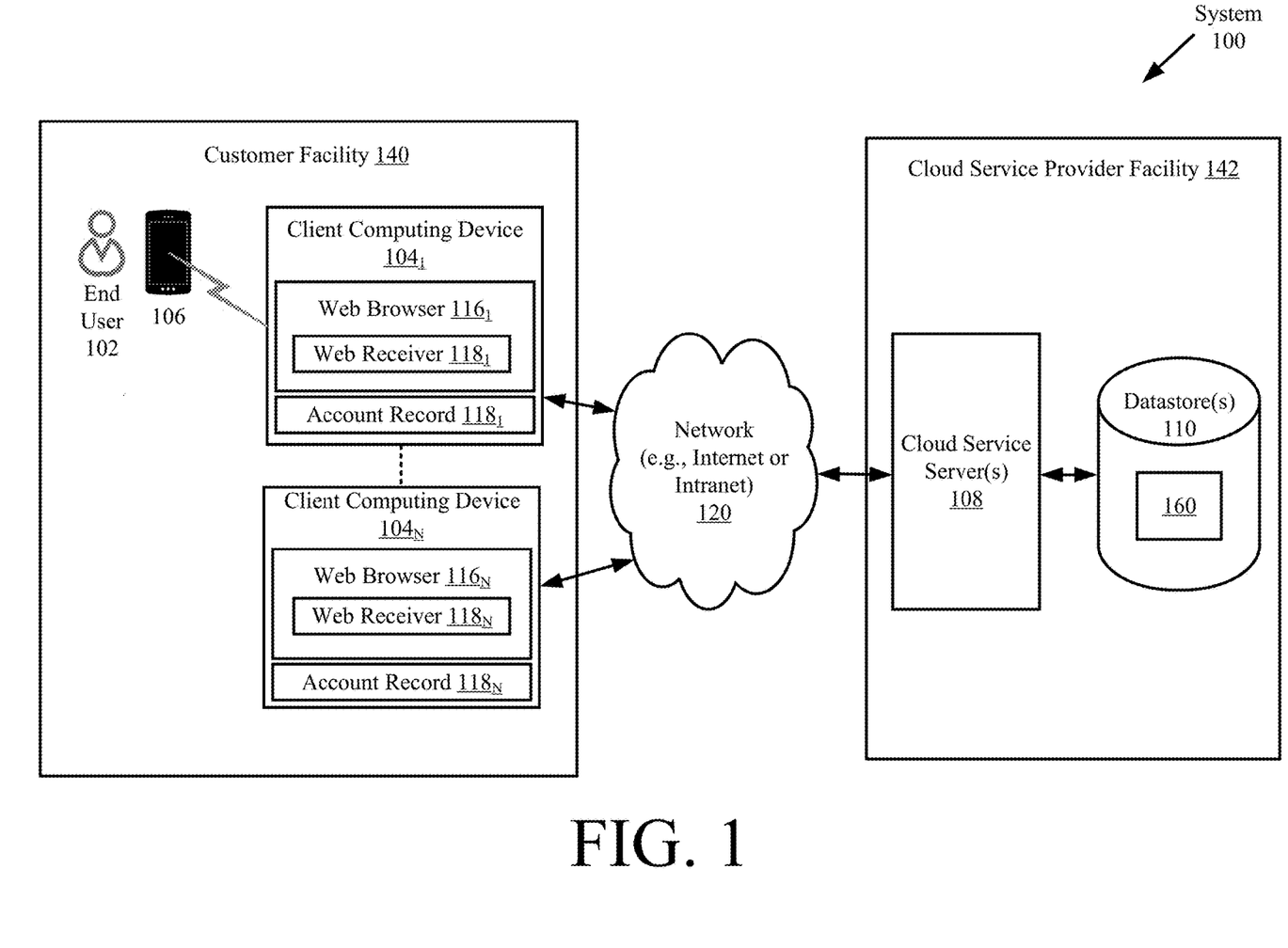
FIG. 1 is an illustration of an illustrative system.

Referring now to FIG. 1, there is provided an illustration of an illustrative system 100. System 100 implements methods for establishing a remote session with a remote cloud service server 108. In this regard, system 100 comprises a customer facility 140 and a cloud service provider facility 142. The customer facility 140 comprises one or more buildings of a customer, such as a business organization (e.g., a hospital). The customer has at least one end user 102. The end user can include, but is not limited to, an employee. The end user 102 uses the client computing devices $104_1$-$104_N$ (e.g., thin clients) for a variety of purposes, such as accessing and using cloud services provided by a cloud service provider. In this regard, the client computing devices $104_1$-$104_N$ are configured to facilitate access to applications and virtual desktops without interruptions resulting from connectivity loss. Accordingly, the client computing devices $104_1$-$104_N$ have installed thereon and execute various software applications. These software applications include, but are not limited to, Web Browsers $116_1$-$116_N$ and/or Web Receivers $118_1$-$118_N$. Web Browsers and Web Receivers are well known in the art, and therefore will not be described herein. Any known or to be known Web Browser and Web Receiver can be used herein without limitation.

In some scenarios, the Web Receivers $118_1$-$118_N$ can respectively include, but are not limited to, Citrix Receivers available from Citrix Systems, Inc. of Florida and Citrix Receivers for a web site available from Citrix Systems, Inc. of Florida. Citrix Receivers comprise client software that is required to access applications and full desktops hosted by servers remote from client devices. The present solution is not limited in this regard.

The client computing devices $104_1$-$104_N$ also have various information stored internally. This information includes, but is not limited to, account records $120_1$-$120_N$. The client computing devices $104_1$-$104_N$ are able to communicate with each other via an Intranet and with external devices via the Internet. The Intranet and Internet are shown in FIG. 1 as a network 120.

The external devices include one or more cloud service servers 108 located at the cloud service provider facility 142. The cloud service provider facility 142 comprises one or more buildings of a cloud service provider. The server(s) 108 is(are) configured to facilitate access to applications and virtual desktops without interruptions resulting from connectivity loss. Accordingly, the server 108 has installed thereon and executes various software applications. The software applications include, but are not limited to, a StoreFront and a Desktop Delivery Controller ("DDC"). StoreFronts and DDCs are well known in the art, and therefore will not be described herein. Any known or to be known StoreFront and/or DDC can be employed herein.

The server 108 is also configured to access the datastore 110 in which publishing information 160 is stored, and is also able to write/read from the datastore(s) 110. The publishing information 160 includes, but is not limited to, software applications, code, media content (e.g., text, images, videos, etc.), and/or user authentication information (e.g., a user name and/or facial feature information).

During operation, a two-factor authentication process is performed for authenticating an end user prior to establishing a session between a client computing device $104_1$-$104_N$ and the cloud service server 108. The two-factors used herein comprise the end user's proximity to the client computing device and the facial recognition of the end user.

When the end user 102 arrives within proximity of a client computing device $104_1$-$104_N$, the mobile device 106 transmits a unique identifier for the end user 102 (e.g., a username) to the client computing device $104_1$-$104_N$. The client computing device $104_1$-$104_N$ then initiates its facial recognition operations. Facial recognition operations are well known in the art, and therefore will not be described in detail herein. Any known or to be known facial recognition operations can be used herein without limitation. In some scenarios, the facial recognition operations involve: capturing an image of the end user's face; and perform image processing to recognize the end user's face by the client computing device. The end user's face is recognized by comparing selected facial features from the captured image and a face database. The client computing device then obtains a username stored in datastore 110 so as to be associated with the face database (e.g., information specifying facial features of the user's face). The username is compared to the user's unique identifier received from the mobile device 106. If a match exists, the user's remote session is launched on the client computing device $104_1$-$104_N$.

Figure 2:
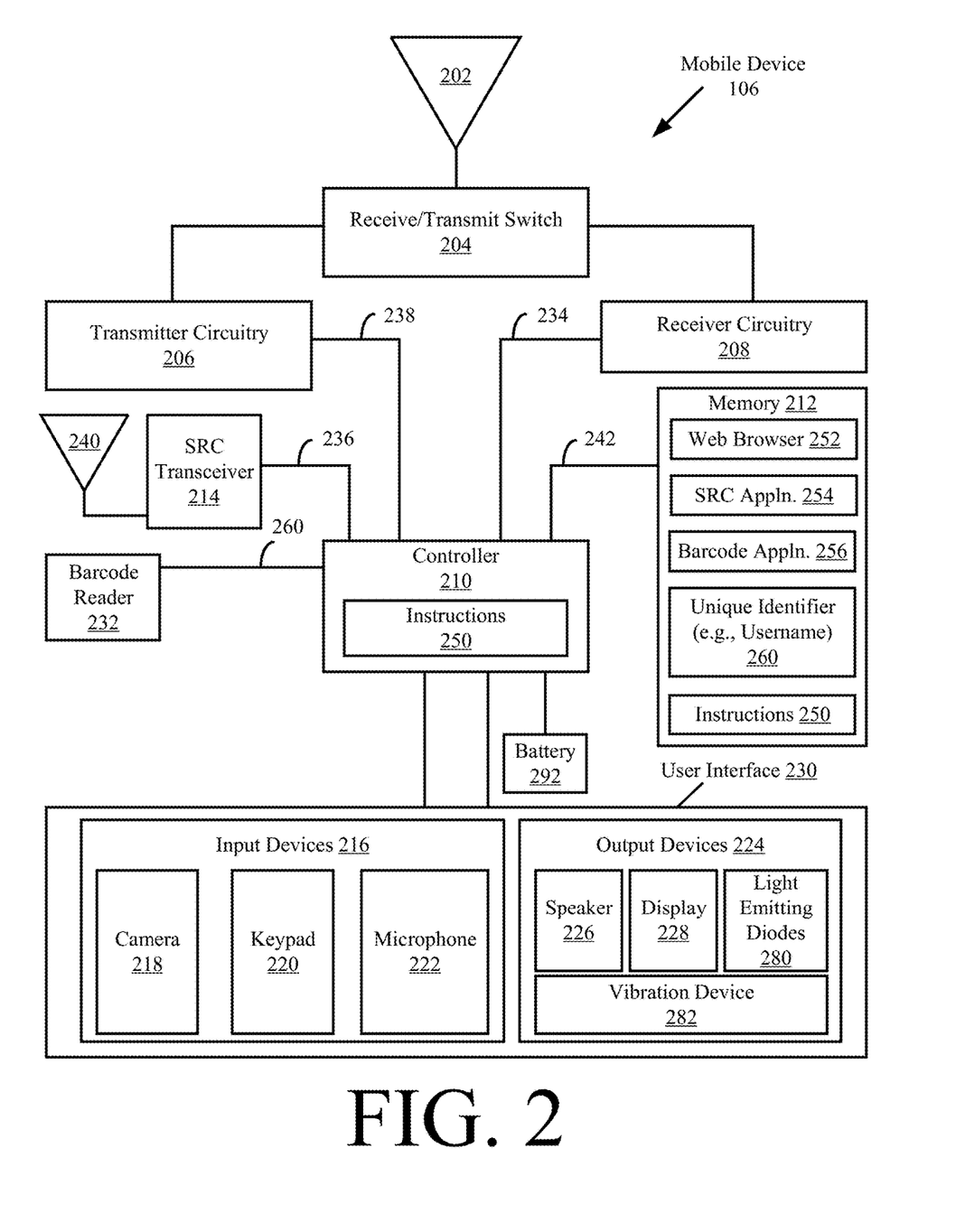
FIG. 2 is an illustration of an illustrative architecture for the mobile device shown in FIG. 1.

Referring now to FIG. 2, there is provided an illustration of an exemplary architecture for the mobile device 106 of FIG. 1. Mobile device 106 may include more or less components than those shown in FIG. 2. However, the components shown are sufficient to disclose an illustrative embodiment implementing the present solution. Some or all of the components of the mobile device 106 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As noted above, the mobile device 106 can include, but is not limited to, a notebook computer, a personal digital assistant, a cellular phone or a mobile phone with smart device functionality (e.g., a Smartphone). In this regard, the mobile device 106 comprises an antenna 602 for receiving and transmitting Radio Frequency ("RF") signals. A receive/transmit ("Rx/Tx") switch 204 selectively couples the antenna 202 to the transmitter circuitry 206 and the receiver circuitry 208 in a manner familiar to those skilled in the art. The receiver circuitry 208 demodulates and decodes the RF signals received from an external device. The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the mobile device 106. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device via the Rx/Tx switch 204.

The mobile device 106 also comprises an antenna 240 coupled to a Short Range Communications ("SRC") transceiver 214 for receiving SRC signals. SRC transceivers are well known in the art, and therefore will not be described in detail herein. However, it should be understood that the SRC transceiver 214 processes the SRC signals to extract information therefrom. The SRC transceiver 214 may process the SRC signals in a manner defined by the SRC application 254 installed on the mobile device 106. The SRC application 254 can include, but is not limited to, a Commercial Off the Shelf ("COTS") application (e.g., a Bluetooth application). The SRC transceiver 214 is coupled to the controller 210 via an electrical connection 236. The controller uses the extracted information in accordance with the function(s) of the mobile device 106. For example, the extracted information can include a unique identifier received from a client computing device $104_1$, . . . , $104_N$ of FIG. 1. The unique identifier can be used by the mobile device 106 to initiate or enable user authentication functions thereof as described herein. The user authentication functions can involve: obtaining a unique identifier for the user (e.g., unique identifier 260) via a user-software interaction or via a datastore read operation; and communicating the unique identifier to a remote cloud service server (e.g., cloud service server 108 of FIG. 1).

The controller 210 may store received and extracted information in memory 212 of the mobile device 106. Accordingly, the memory 212 is connected to and accessible by the controller 210 through electrical connection 242. The memory 212 may be a volatile memory and/or a non-volatile memory. For example, memory 212 can include, but is not limited to, a Random Access Memory ("RAM"), a Dynamic RAM ("DRAM"), a Read Only Memory ("ROM") and a flash memory. The memory 212 may also comprise unsecure memory and/or secure memory. The memory 212 can be used to store various other types of data 260 therein, such as authentication information, cryptographic information, location information, and various work order related information.

The mobile device 106 also may comprise a barcode reader 232. Barcode readers are well known in the art, and therefore will not be described herein. However, it should be understood that the barcode reader 232 is generally configured to scan a barcode and process the scanned barcode to extract information therefrom. The barcode reader 232 may process the barcode in a manner defined by the barcode application 256 installed on the mobile device 106. Additionally, the barcode scanning application can use camera 218 to capture the barcode image for processing. The barcode application 256 can include, but is not limited to, a COTS application. The barcode reader 232 provides the extracted information to the controller 210. As such, the barcode reader 232 is coupled to the controller 210 via an electrical connection 260. The controller 210 uses the extracted information in accordance with the function(s) of the mobile device 106. For example, the extracted information can be used by mobile device 106 to enable user authentication functionalities thereof.

As shown in FIG. 2, one or more sets of instructions 250 are stored in memory 212. The instructions may include customizable instructions and non-customizable instructions. The instructions 250 can also reside, completely or at least partially, within the controller 210 during execution thereof by mobile device 106. In this regard, the memory 212 and the controller 210 can constitute machine-readable media. The term "machine-readable media", as used herein, refers to a single medium or multiple media that stores one or more sets of instructions 250. The term "machine-readable media", as used here, also refers to any medium that is capable of storing, encoding or carrying the set of instructions 250 for execution by the mobile device 106 and that causes the mobile device 106 to perform one or more of the methodologies of the present disclosure.

The controller 210 is also connected to a user interface 230. The user interface 230 comprises input devices 216, output devices 224 and software routines (not shown in FIG. 2) configured to allow a user to interact with and control software applications (e.g., software applications 252-256 and other software applications) installed on the mobile device 106. Such input and output devices may include, but are not limited to, a display 228, a speaker 226, a keypad 220, a directional pad (not shown in FIG. 2), a directional knob (not shown in FIG. 2), a microphone 222, and a camera 218. The display 228 may be designed to accept touch screen inputs. As such, user interface 230 can facilitate a user software interaction for launching applications (e.g., software applications 252-256 and other software applications) installed on the mobile device 106. The user interface 230 can facilitate a user-software interactive session for: initiating communications with an external device; writing data to and reading data from memory 212; and/or initiating user authentication operations for authenticating a user such that a remote session between a nearby client computing device and a remote cloud service server.

The display 228, keypad 220, directional pad (not shown in FIG. 2) and directional knob (not shown in FIG. 2) can collectively provide a user with a means to initiate one or more software applications or functions of the mobile device 106. The application software 252-258 can facilitate the data exchange (a) a user and the mobile device 106, and/or (b) the mobile device 106 and a client computing device $104_1, \ldots, 104_N$. In this regard, the application software 252-256 performs one or more of the following: facilitated verification of the identity of a user of mobile device 106 via an two-factor authentication process; and/or present information to the user indicating this his/her identity has or has not been verified.

Figure 3:
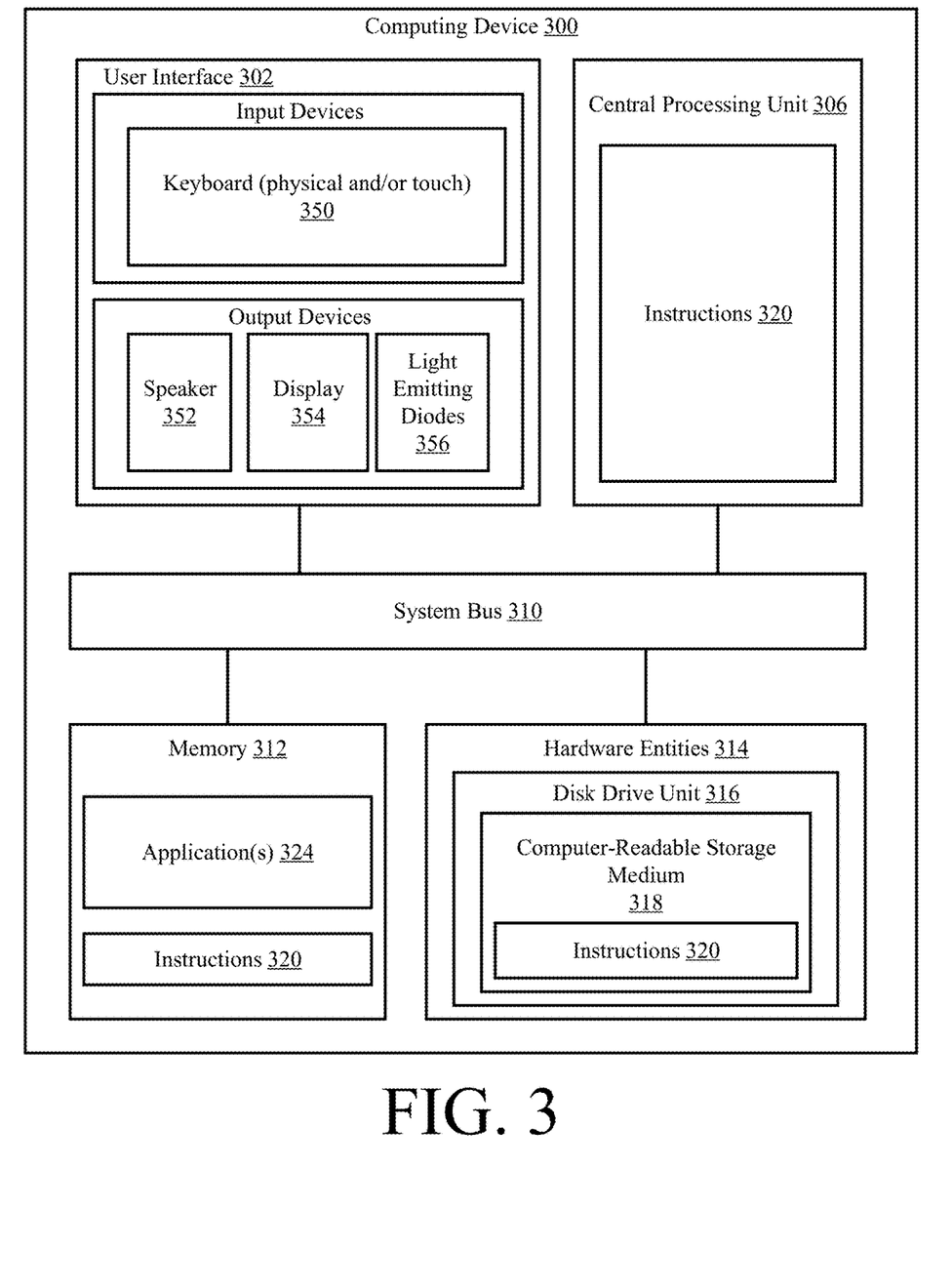
FIG. 3 is an illustration of an illustrative architecture for the computing device shown in FIG. 1.

Referring now to FIG. 3, there is provided an illustration of an exemplary architecture for a computing device 300. Computing devices $104_1$-$104_N$ and/or server(s) 108 of FIG. 1 (is) are the same as or similar to computing device 300. As such, the discussion of computing device 300 is sufficient for understanding these components of system 100.

In some scenarios, the present solution is used in a client-server architecture. Accordingly, the computing device architecture shown in FIG. 3 is sufficient for understanding the particulars of client computing devices and servers.

Computing device 300 may include more or less components than those shown in FIG. 3. However, the components shown are sufficient to disclose an illustrative solution implementing the present solution. The hardware architecture of FIG. 3 represents one implementation of a representative computing device configured to enable watermarking of graphics, as described herein. As such, the computing device 300 of FIG. 3 implements at least a portion of the method(s) described herein.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices and output devices, which facilitate user-software interactions for controlling operations of the computing device 300. The input devices include, but are not limited, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356.

At least some of the hardware entities 314 perform actions involving access to and use of memory 312, which can be a Radom Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
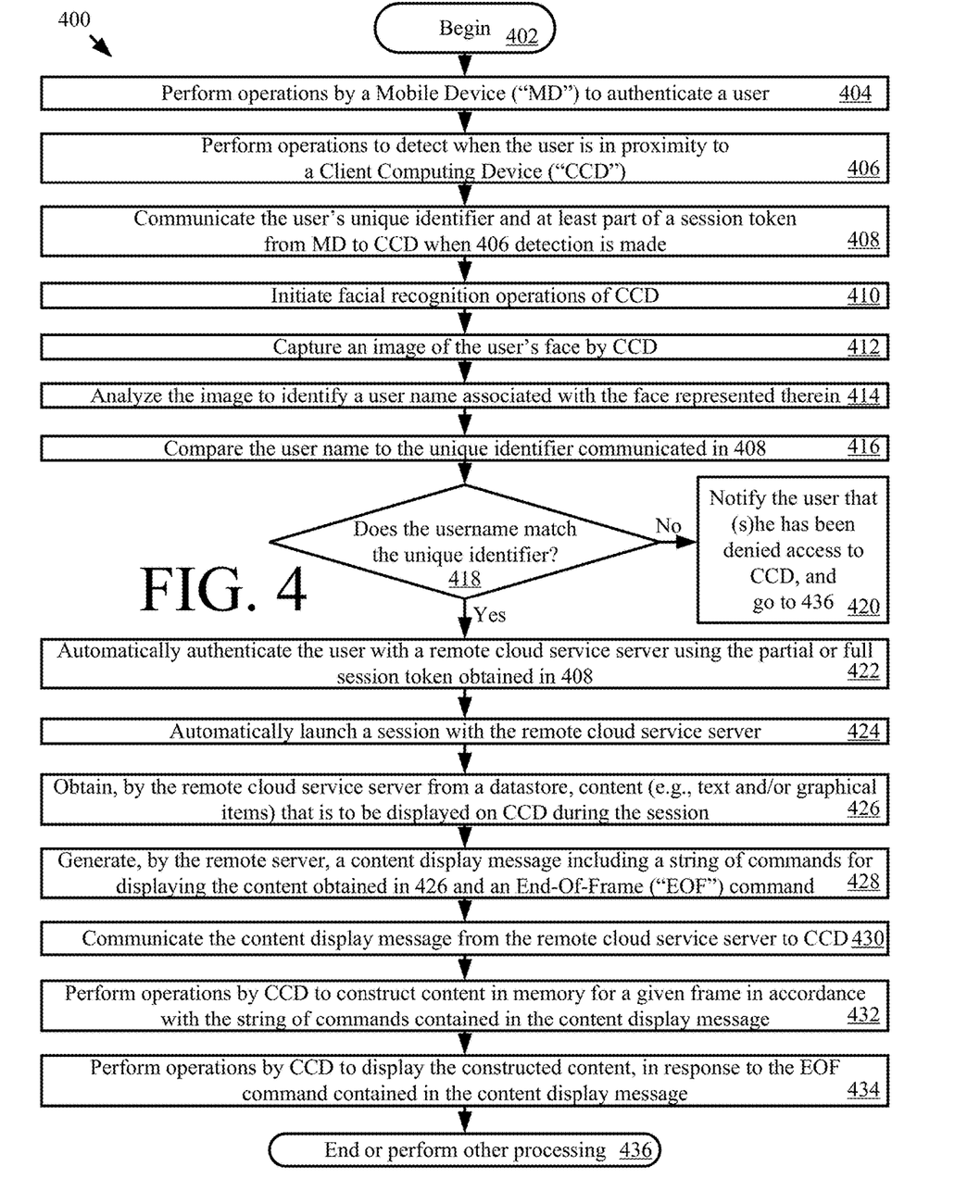
FIG. 4 is a flow diagram of an illustrative method for obtaining access to a session with a remote cloud service server.

Referring now to FIG. 4, there is shown a flow diagram of an illustrative method 400 for providing remote desktop access using proximity and facial recognition as a two-factor authentication. Method 400 comprises a plurality of operations 402-436. The present solution is not limited to the order of operations 402-436 shown in FIG. 4. The operations of 402-436 can be performed in a different order (than that shown) in accordance with a given application.

As shown in FIG. 4, method 400 begins with 402 and continues with 404 where a mobile device (e.g., mobile device 106 of FIG. 1) performs operations to authenticate a user (e.g., end user 102 of FIG. 1). The user authentication is achieved by: receiving a user-software interaction for inputting user authentication information (e.g., a pin and/or password); and comparing the inputted user authentication information to pre-stored user authentication information. If the inputted and pre-stored user authentication information match each other, then the user's identity is authenticated or verified by the mobile device. Notably, the user authentication operations of 404 only need to be performed once for purposes of providing the user access to a session with a remote cloud service server (e.g., cloud service server 108 of FIG. 1) via any one of a plurality of client computing devices (e.g., client computing devices $104_1, \ldots, 104_N$ of FIG. 1) employing a two-factor authentication process. However, it should be understood that the mobile device's authentication of 404 may be performed in accordance with rules or a timing scheme specified by an issued certification (e.g., daily, weekly, monthly, yearly, each time a user moves from one location to another location, and/or each time the user enters a given area or location).

The two-factor authentication process is now described in relation to 406-416. 406 involves performing operations to detect when the user is in proximity to a client computing device. Techniques for detecting when a user or device is in proximity to a computing device are well known in the art. Any known or to be known technique for detecting when a user or device is in proximity to a computing device can be used herein without limitation. For example, in some scenarios, the client computing device comprises an iBeacon that transmits a beacon signal comprising a first unique identifier (e.g., a Universal Unique Identifier ("UUID") for a business entity and a second unique identifier (e.g., an IP address of the computing device). When the mobile device is in range of the iBeacon, it receives the beacon signal. A detection is made that the user is in proximity of the CCD when the mobile device receives a beacon signal having the first unique identifier. The present solution is not limited to the particulars of this example. Additionally or alternatively, the operations of 406 involve: (A) detecting when there is a break in a beam emitted by a beam brake sensor; and/or (B) prompting the user to place the mobile device in proximity of the client computing device, and detecting when the mobile device is in proximity to the client computing device.

When the detection is made in 406, the user's unique identifier and at least part of a session token is communicated from the mobile device to the client computing device, as shown by 408. In some scenarios, this communication is achieved using a beacon response signal or a SRC (e.g., a Bluetooth communication). The present solution is not limited to the particulars of this example. The partial session token can be used by the client computing device to obtain a full session token. Session tokens are well known in the art, and therefore will not be described herein. Any known or to be known session token (partial or full) can be used herein without limitation.

Facial recognition operations of the client computing device are initiated in 410 responsive to the client computing device's reception of the user's unique identifier in 408. Facial recognition operations are well known in the art, and therefore will not be described in detail here. Any known or to be known facial recognition technique can be used herein without limitation. For example, in some scenarios, the facial recognition is achieved by performing operations in 412-414 by the client computing device to: capture an image of the user's face; and analyze the image to identify a user name associated with the face represented in the captured image. The user name is identified by: comparing facial features of the captured image to a facial feature database including facial feature information for a plurality of individuals; detecting a match of the captured image's facial features and those associated with one of the individuals; and retrieving a user name associated with the individual having the matching facial features. The present solution is not limited to the particulars of this example.

In next 416, the user name is compared to the unique identifier communicated in 408. If a match does not exist between the user name and unique identifier [418:NO], then method 400 continues with 420 where the user is notified that (s)he has been denied access to the client computing device. Subsequently, 436 is performed. In 436, method 400 ends or other processing is performed (e.g., the computing device provides the user with another way to be authenticated for purposes of accessing a session, such as via a user-software interaction for inputting a username and password).

In contrast, if a match does exist between the user name and unique identifier [418:YES], then method 400 continues with 422 where the user is automatically authenticated with a remote cloud service server (e.g., cloud service server 108 of FIG. 1) using the partial or full session token obtained in 408. Once authenticated, a session is launched with the remote cloud service server, as shown by 424. Techniques for launching a session are well known in the art, and therefore will not be described herein. Any known or to be known technique for launching a session can be used herein without limitation.

During the session, the cloud service server receives graphics from the datastore, as shown by 426. In 428, the cloud service server performs operations to generate a content display message. The content display message comprises a string of commands for displaying the content obtained in 426 and an End-Of-Frame ("EOF") command. The content display message is communicated from the cloud service server (e.g., cloud service server 108 of FIG. 1) to the client computing device (e.g., to the Web Receiver $118_1$ of FIG. 1) in 430. In 432, the client computing device performs operations to construct content in memory for a given frame in accordance with the string of commands contained in the content display message. Next in 434, the client computing device displays the constructed content in response to the EOF command. Subsequently, 436 is performed where method 400 ends or other processing is performed (e.g., return to 404, 406 or 426).

Figure 5:
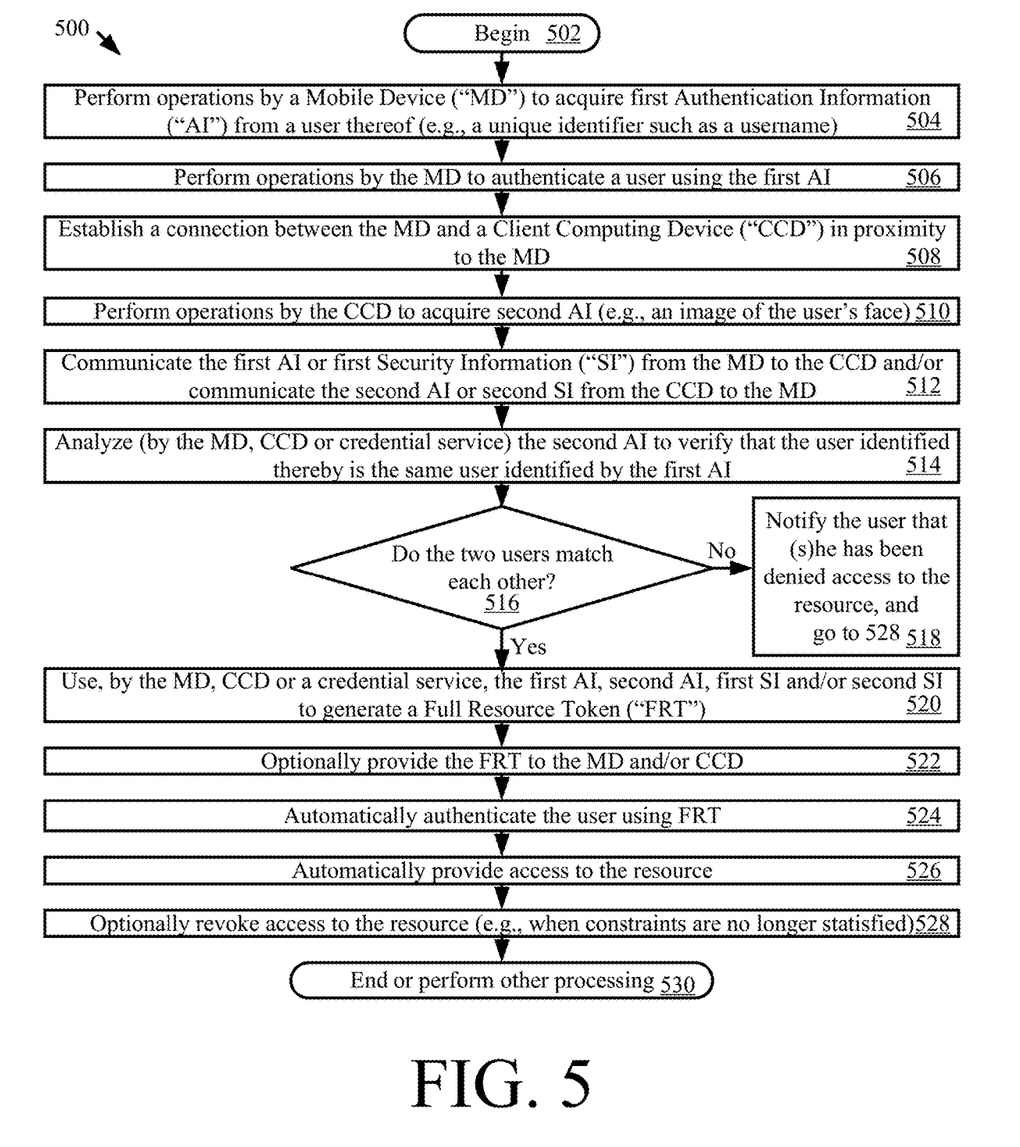
FIG. 5 is a flow diagram of another illustrative method for obtaining access to a session with a remote cloud service server.

Referring now to FIG. 5, there is provided a flow diagram of another illustrative method 500 for obtaining access to an access restricted resource. Method 500 comprises a plurality of operations 502-530. The present solution is not limited to the order of operations 502-530 shown in FIG. 5. The operations of 502-530 can be performed in a different order (than that shown) in accordance with a given application.

As shown in FIG. 5, method 500 begins with 502 and continues with 504 where a MD (e.g., MD 106 of FIG. 1) performs operations to acquire first Authentication Information ("AI") from a user thereof. The first AI can include, but is not limited to, a username, a password, an access code, a certificate, a pin, biometric information, or another authentication information required by a user authentication process employed by the MD. Such user authentication processes are well known in the art, and therefore will not be described herein. Any known or to be known user authentication process can be used herein without limitation. In 506, the MD uses the first AI to authenticate the user.

Next in 508, a connection is established between the MD and a CCD (e.g., CCD 104$_1$ of FIG. 1) in proximity to the MD. Techniques for establishing connections between devices are well known in the art, and therefore will not be described herein. Any known or to be known technique for establishing a connection between two devices can be used herein without limitation. The CCD performs operations in 510 to acquire second AI. The second AI can include, but is not limited to, a username, a password, an access code, a certificate, a pin, biometric information, smart card information, or another authentication information required by a user authentication process employed by the MD.

In 512, information is exchanged between the MD and the CCD. For example, the first AI and/or first Security Information ("SI") derived from the first AI is communicated from the MD to the CCD. Additionally or alternatively, the second AI or second SI derived from the second AI is communicated from the CCD to the MD. The first and second SI can include, but is not limited to, a hash of the AI, a secondary token unlocked by the AI, and/or a ticket from a credential service.

The first and second AI is analyzed in 514 to verify that the users identified thereby are the same. In some scenarios, this verification is made by comparing the first AI directly to the second AI to determine if a match exists therebetween. In other scenarios, this verification is made by: obtaining first user identification information contained in the first AI; obtaining second user identification information stored in a remote datastore (e.g., datastore 110 of FIG. 1) using the second AI; and comparing the first and second user identification information to determine if a match exists therebetween. In yet other scenarios, this verification is made by: obtaining third user identification information contained in the second AI; obtaining fourth user identification information stored in a remote datastore (e.g., datastore 110 of FIG. 1) using the first AI; and comparing the third and fourth user identification information to determine if a match exists therebetween. The present solution is not limited to the particulars of these scenarios.

If not [516:NO], then method 500 continues with 518 where the user is notified that (s)he has been denied access to the client computing device. This notification can be provided of the user via the MD and/or the CCD. Subsequently, 528 is performed. In 528, method 500 ends or other processing is performed (e.g., the computing device provides the user with another way to be authenticated for purposes of accessing a session, such as via a user-software interaction for inputting a username and password).

If the two users match each other [516:YES], then method 500 continues with 520 where operations are performed by the MD, CCD or a credential service (e.g., provide by cloud service server 108 of FIG. 1) to generate a Full Resource Token ("FRT") based on the first AI, the second AI, the first SI and/or the second SI. Techniques for generating tokens are well known in the art, and therefore will not be described herein. Any known or to be known technique for generating tokens can be used herein without limitation. The FRI is then optionally provided to the MD and/or CCD as shown by 522.

In 524, the FRT is used to authenticate the user. Once authenticated, the user is provided access to the resource (e.g., a cloud based service or medical record) as shown by 526. In some scenarios, the access is revoked in optional 528 (e.g., when constraints are no longer satisfied (such as when the doctor leaves an office)). Subsequently, 530 is performed where method 500 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for obtaining access to a session with a remote cloud service server, comprising:
   receiving, by a first client computing device, a user unique identifier from a mobile device located in proximity to the first client computing device, the user unique identifier identifying a user of the mobile device and being different than a device identifier and a device address;
   initiating facial recognition operations by the first client computing device responsive to the reception of the user unique identifier, where the facial recognition operations comprise
   capturing an image of the mobile device's user, and
   analyzing the image to obtain a user name that is stored in a datastore associated with the facial features represented in the image;
   performing the facial recognition operations by the first client computing device;
   determining, by the first client computing device, if the user name obtained during the facial recognition operations matches the user unique identifier received from the mobile device; and
   automatically launching a first session with the remote cloud service server responsive to a determination that the user name obtained during the facial recognition operations matches the user unique identifier received from the mobile device.

2. The method according to claim 1, further comprising receiving, by the first client computing device, a partial or full session token sent from the mobile device along with the user unique identifier.

3. The method according to claim 2, further comprising using the partial or full session token to further authenticate the user with the remote cloud service server when a determination is made that the user name matches the user unique identifier.

4. The method according to claim 1, wherein the user obtains access to the first session without entering credentials into the first client computing device.

5. The method according to claim 1, wherein the user is authenticated once by the mobile device prior to obtaining access to a first session at a first time using the first client computing device and access to a second session at a second time using a second different client computing device.

6. The method according to claim 5, wherein the user is periodically authenticated by the mobile device in accordance with a timing scheme of a certificate issued to the mobile device.

7. The method according to claim 1, further comprising detecting when the mobile device is in proximity to the first client computing device using a beacon of the first client computing device.

8. The method according to claim 1, wherein the username is obtained during the analyzing by:
comparing facial features of the image to a facial feature database including facial feature information for a plurality of individuals;
detecting a match of the image's facial features and the facial features associated with an individual of the plurality of individuals; and
retrieving the user name associated with the individual having the matching facial features.

9. The method according to claim 1, further comprising allowing the user access to the first session using a manual user input based authentication scheme if the user name does not match the user unique identifier.

10. A system, comprising:
a processor; and
a non-transitory computer-readable storage medium comprising programming instructions that are configured to cause the processor to implement a method for obtaining access to a session with a remote cloud service server, wherein the programming instructions comprise instructions to:
receive a user unique identifier from a mobile device located in proximity to the processor, the user unique identifier identifying a user of the mobile device and being different than a device identifier and a device address;
initiate facial recognition operations responsive to the reception of the user unique identifier, where the facial recognition operations comprise
capturing an image of the mobile device's user, and
analyzing the image to obtain a user name that is stored in a datastore so as to be associated with the facial features represented in the image;
perform the facial recognition operations;
determine if the user name obtained during the facial recognition operations matches the user unique identifier received from the mobile device; and
automatically launch a first session with the remote cloud service server responsive to a determination that the user name obtained during the facial recognition operations matches the user unique identifier received from the mobile device.

11. The system according to claim 10, wherein the programming instructions further comprise instructions to receive a partial or full session token sent from the mobile device along with the user unique identifier.

12. The system according to claim 11, wherein the programming instructions further comprise instructions to use the partial or full session token to further authenticate the user with the remote cloud service server when a determination is made that the user name matches the user unique identifier.

13. The system according to claim 10, wherein the user obtains access to the first session without entering credentials into the system.

14. The system according to claim 10, wherein the user is authenticated once by the mobile device prior to obtaining access to the first session at a first time using a first client computing device and access to a second session at a second time using a second different client computing device.

15. The system according to claim 14, wherein the user is periodically authenticated by the mobile device in accordance with a timing scheme of a certificate issued to the mobile device.

16. The system according to claim 10, further comprising a beacon configured to facilitate a detection of when the mobile device is in proximity to the system.

17. The system according to claim 10, wherein the username is obtained by:
comparing facial features of the image to a facial feature database including facial feature information for a plurality of individuals;
detecting a match of the image's facial features and the facial features associated with an individual of the plurality of individuals; and
retrieving the user name associated with the individual having the matching facial features.

* * * * *